Patented Apr. 12, 1927.

1,624,154

UNITED STATES PATENT OFFICE.

MAX WINCKEL, OF BERLIN, GERMANY, ASSIGNOR TO HERMAN G. WEICKER, TRUSTEE, OF MONTCLAIR, NEW JERSEY.

VITAMINE PREPARATION.

No Drawing.   Application filed August 11, 1925. Serial No. 49,655.

This invention relates to a vitamine preparation containing all of the vitamines combined with other therapeutically valuable substances including calcium salts, sour milk bacteria and the like. The invention includes the novel product as well as improvements in the method of producing the same.

Healthy human metabolism requires the presence of a number of products performing different functions and cooperating to bring about a normal and healthy matabolism. The tendency to eat too much meat and cereals and an insufficiency of fruits, vegetables, milk and the like is responsible for much ill health and many diseases dependent on improper metabolism, as carbuncles, boils and other diseases dependent on impure blood, and scurvy, rickets and similar troubles caused by an insufficiency of certain vitamines. An unbalanced diet also frequently results in an unhealthy intestinal flora with its attendant diseases.

In the past too much weight has been placed on treating the individual symptoms or disorders by the addition of a single lacking ingredient in the diet. Thus preparations have been put on the market which contain one or more of the vitamines necessary to health. Calcium deficiency has been supplied by feeding lime salts. A beneficial acid flora in the intestines has been brought about by feeding yoghurt or other sour milk preparations containing for example the Bulgarain bacillus and other beneficial bacteria, and other deficiencies have been treated by supplying the lacking ingredients, for example magnesium salts, iron salts, fruit acids and the like, without regard to the other necessary ingredients for a normal and healthy metabolism. As a result, the attempt to supply a deficiency by adding the lacking ingredients alone may entail other disadvantages, for example too much fruit acid or too much sour milk may upset the digestion and cause other troubles, similarly the addition of lime salts, usually in the form of the carbonate, in large quantities may destroy the acidity of the stomach and impair the efficiency of digestion in that organ.

According to the present invention the necessary and important ingredients for supplementing a modern diet in order to produce a normal and healthy metabolism are combined together in such a way that the advantages of the various ingredients are retained without their corresponding disadvantage. Thus for example, the excess acidity of sour milk preparations and fruit acids is used to neutralize the alkalinity of the lime salts to be added and the final preparation contains the necessary ingredients in such form as to be best assimilated by the human body and to cause no undesirable side effects.

Yeast is added to supply further vitamines and to increase and catalyze the activity of the sour milk bacilli. The various ingredients thus cooperate with each other to produce an improved result.

According to the present invention I combine bacteria produced by culturing skim milk with yoghurt cultures, or similar bacterial cultures, with calcium carbonate added in small amounts to neutralize the acidity and form calcium lactate, thus increasing the growth and vegetation of the bacteria, which is impeded by too acid a solution, and I also incorporate the vitamines, lecithin, lipoids and proteins of yeast together with the beneficial ferments, and may add such ingredients, as sodium, magnesium and iron salts combined with the acid of milk or with fruit acids so that the final product is neither too strongly acid nor too alkaline for the digestive system and contains all of the ingredients in a particularly effective form.

The invention will be further illustrated by the following specific examples of the process of preparing my improved product but is not limited to the exact procedure set forth.

Example I.

100 liters of skim milk is boiled for a short time and then cooled down to 50° C. A suitable amount of a pure yoghurt culture or other culture containing Bulgarian bacillus or similar bacillus is mixed with a liter of the same milk and then added to the main amount of milk. The mixture is allowed to stand at a temperature of about 46 to 48° and 500 grams of calcium carbonate is stirred in in small portions during an hour. Fermentation is permitted to continue at the same temperature until the milk has coagulated whereupon a mixture of 1 kg. dry beer yeast, from which the bitter constituents have been removed, and 1 kg. calcium carbonate stirred into 5 liters of fermented milk is added and thoroughly stirred in. The mixture is then permitted to ferment for about 2 to 3 hours longer and then neutralized with calcium carbonate and again allowed to stand at 46 to 48° C. with thorough stirring for about 2 to 3 hours. The mass is then rapidly dried at a low temperature and is recovered in the form of a fine powder.

Example II.

100 liters of skim milk is treated with the yoghurt culture as in Example I but instead of using calcium carbonate alone a mixture of 9 parts of calcium carbonate to 1 of magnesium carbonate is used. The procedures, amounts and temperatures are the same as in Example I.

Example III.

A product is prepared as in Examples I and II but the juice of six lemons is added to the milk. Instead of lemon juice an equivalent amount of other fruit juices such as orange juice may be substituted or a mixture of juices may be used.

Example IV.

A product is produced according to the foregoing examples and a small amount of sodium salts of the fruit acids and iron lactate is added. The addition may take place at any suitable point during the process.

Example V.

Nourishing, concentrated foods are prepared by incorporating the products of the foregoing examples with a malt powder rich in albumen, and diastase. This food is particularly recommended for diabetics and may also be used with advantage by patients suffering from tuberculosis, delicate children, pregnant women, nursing mothers, old people, convalescents and in fact any one requiring a concentrated nourishment containing the necessary mineral salts, vitamines etc. for healthy metabolism.

In the specific examples, I have described the use of beer yeast but other types of yeast such as bakers' yeast may be used. The presence of the lime salts not only makes the product more important for human consumption but it also increases the efficiency of the process itself. The lime appears to act catalytically not only on the fermentation of the milk itself but also on the yeast and the production of bacteria and bacterial ferment is greatly increased by the presence of the lime salts. The final product contains the lime salts and any sodium, magnesium or iron salts in the form of lactates, or salts of the various fruit acids, a form in which these products are readily assimilated into the human body and do not disturb the normal digestion. The product is substantially neutral and does not injure the digestions of people who are particularly sensitive either to alkalies or acid compounds.

The product of the present invention, combining as it does lime salts, sour milk bacteria, milk and fruit acids and the bacteria, ferments and other constituents of yeast is admirably suited to supplement the diet of people who do not gather sufficient amount of vitamines and the other necessary ingredients for the best health. Thus the product is particularly useful in the cases of people suffering from blood troubles, such as boils, scorbutic troubles and the like, brain workers who tend to take too concentrated a meat and bread diet, growing children who require unusual amounts of calcium and people who are run-down in health at any age. The product is particularly useful to supplement the diet of pregnant women and nursing mothers who require a much larger amount of lime than does the normal human being.

The product of the present invention is also useful in the case of people suffering from tuberculosis, diabetes, and similar diseases for although it has no direct curative action on either of these diseases it tends to build up the strength and resistance of the human body and greatly aids in combating the inroads of disease.

The products in the form of a fine powder may be taken by mixing with food stuffs, such as milk and the like, by the incorporation into various kinds of milk puddings after cooling and in other ways. I may also prepare a chocolate or other confection containing the product of the present invention.

It will thus be seen that the present invention provides new and improved products combining the various ingredients needed to supplement unbalanced diets in a form in which they can be readily assimilated by the human system and without injury even to delicate digestions. The process also combines the various ingredients so that they cooperate to increase the effectiveness one of the other resulting in the production of a product rich in the desirable ferments, bacteria, fruit acids, calcium compounds, vitamines and the like.

I claim:

1. A process of preparing a vitamine preparation which comprises inoculating skim milk with a culture of sour milk bacillus, fermenting, keeping the acidity down with addition of alkaline earth metal carbonates which do not form physiologically poisonous products, continuing the fermentation until the milk coagulates, adding yeast, continuing the fermentation for a few hours and neutralizing the product.

2. The process according to claim 1 in which fruit juices are added before final neutralization.

3. The process of preparing a vitamine preparation which comprises inoculating about 100 liters of skim milk with a culture of yoghurt, fermenting until the milk coagulates while keeping down the acidity by the gradual addition of about 1500 grams of calcium carbonate, adding about 1 kilo of dry yeast in about 1 liter of fermented milk and 1 kilo of calcium carbonate, continuing the fermentation for from about 2 to 3 hours and neutralizing the product.

4. The process according to claim 3 in which an amount of fruit juices corresponding to 6 lemons is added before final neutralization.

In testimony whereof I affix my signature.

DR. MAX WINCKEL.